United States Patent [19]
Ford

[11] Patent Number: 5,317,249
[45] Date of Patent: May 31, 1994

[54] TRANSMIT MODE DETECTOR IN A BATTERY CHARGER

[75] Inventor: Robert B. Ford, Tamarac, Fla.

[73] Assignee: Motorola, Inc., Schaumburg, Ill.

[21] Appl. No.: 729,667

[22] Filed: Jul. 15, 1991

[51] Int. Cl.$^5$ .............................................. H02J 7/00
[52] U.S. Cl. .......................................... 320/2; 320/22
[58] Field of Search ..................... 320/22, 23, 24, 31, 320/32, 39, 40, 2; 455/79, 127, 89; 379/413

[56] References Cited

U.S. PATENT DOCUMENTS 3,767,995 10/1973 Kaminski et al. ...................... 320/22
4,468,605 8/1984 Fitzgerald et al. ................. 320/40 X
4,673,861 6/1987 Dubovsky et al. ...................... 320/2
4,684,870 8/1987 George et al. ........................ 320/2 X
5,115,182 5/1992 Ehmke et al. ..................... 320/22 X Primary Examiner—Steven L. Stephan
Assistant Examiner—Kristine Peckman
Attorney, Agent, or Firm—Juliana Agon

[57] ABSTRACT

A battery charger for charging a battery (4) for a radio (12), is provided having two terminals (6 and 8). A charging circuit (24 and 26) has a controllable parameter for charging the battery (4). An operational mode detector (30) is coupled to the two terminals (6 and 8) for detecting an operational mode of the radio. A control circuit (22) is coupled to the operational mode detector (30) and to the charging circuit (24 and 26) for controlling the controllable parameter in response to the operational mode detected.

12 Claims, 2 Drawing Sheets

TRANSMIT MODE DETECTOR IN A BATTERY CHARGER

TECHNICAL FIELD

This invention relates generally to battery chargers and more particularly to an interface circuit for a battery charger that detects an operational mode of a device using the battery being charged.

BACKGROUND

Communication devices such as two-way portable radios have different operational modes for transmitting, receiving or standing by. The current drawn from the battery while a radio is transmitting is much higher than that drawn when the same radio is receiving or in a standby mode.

Vehicular chargers for such radios used in a car, have a hard-wired mobile microphone connected to and accessible by the vehicular charger for determining when the radio is transmitting (such as by pushing the push-to-talk (PTT) switch). If the battery is in the radio to be operated, operation of the radio especially while transmitting would draw a high current from the battery being charged, thus reducing the battery's charge capacity. To prevent the above problem, a conventional; vehicular charger will provide a higher charging current to the battery and to the portable transceiver when a portable transceiver or radio is actuated as detected by the state of a push-to-talk (PTT) switch, while connected to the battery and the charging system, as for example, by actuation of the push-to-talk switch on the mobile microphone.

However, in battery chargers such as desk-top chargers, which have no access to the push-to-talk switch of the portable radio, there is no readily available and efficient means of determining the operational mode or status of the radio having its battery being charged. A desk-top charger is a portable charger usually placed on top of a desk or a table.

Accordingly, there exists a need for a charger to detect the operational mode of the radio connected to the battery being charged by accessing only the available battery contacts. There is also a need to utilize a minimum number of inexpensive discrete electronic components in fabricating an operational mode detector.

SUMMARY OF THE INVENTION

Briefly, according to the invention, a battery charger for charging a battery for a radio, has two terminals. A charging circuit has a controllable parameter for charging the battery. An operational mode detector is coupled to the two terminals for detecting an operational mode of the radio. A control circuit is coupled to the operational mode detector and to the charging circuit for controlling the controllable parameter in response to the operational mode detected.

DETAILED DESCRIPTION OF THE PREFERRED EMBODIMENT

Figure 1:
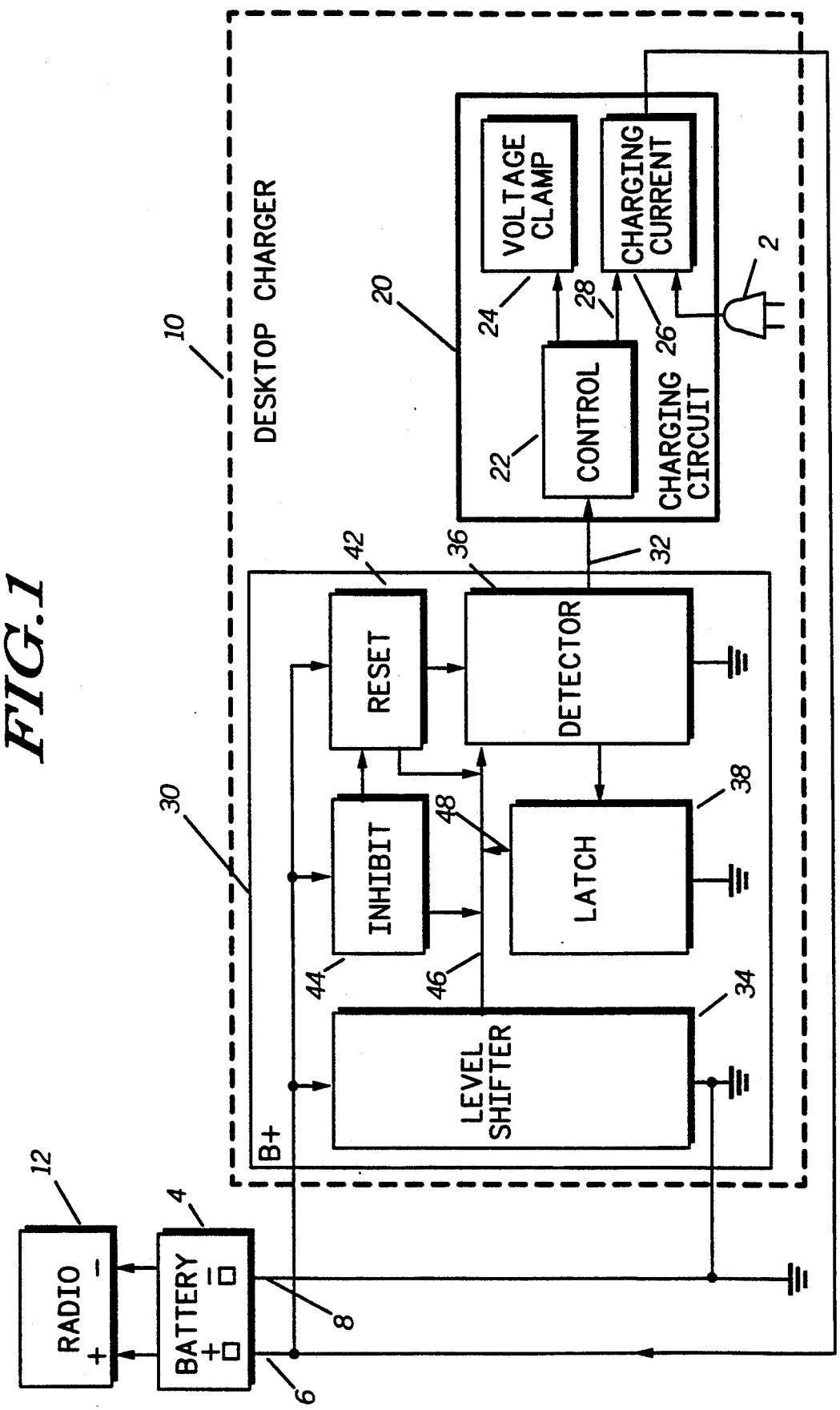
FIG. 1 is a block diagram of an automatic battery charging and voltage regulating system incorporating the features of this invention.

Referring to FIG. 1, a charging system is connected to a commercial alternating current (A/C) source by a plug 2. A battery 4 having battery terminals corresponding to a positive battery charger contact 6 and a negative battery charger contact 8 is connected to a desktop charger 10. The battery 4 is also attached to a current consuming equipment such as a portable transceiver or radio 12. The charger 10 includes a radio transmit mode detector 30 coupled as a battery charger interface circuit to a conventional charging circuit 20. Conventionally, the charging circuit 20 comprises a microprocessor control section 22, a battery voltage clamp section 24, and a battery charging current section 26 to form a control means for a charging means to control the controllable parameters such as charging voltage and/or charging current. The charging voltage developed on a line 28 by the charging circuit 20, is coupled to the battery charging current section 26. According to the invention, the battery charging current section 26 increases the charging current in response to a first control signal to charge the battery 4 attached to the radio 12 when the radio 12 is consuming a higher current, as in a transmit mode.

The radio transmit mode detector 30 signals the charging circuit 20 of the present radio operation mode by sensing the radio battery terminal voltages at its terminals or contacts 6 and 8 and provides a valid output signal 32 that is representative of the radio status such as transmit, standby, or receive to the charging circuit 20. Thus, depending on the operational mode of the radio 12, as detected by voltage drops across the battery charger terminals 6 and 8, the radio transmit mode detector 30 will provide a high or low signal to the microprocessor control section 22. In response to a drop in voltage greater than a predetermined level across the battery charger terminals 6 and 8 associated with a transmitting radio 12, the radio transmit mode detector 30 will provide a high signal to the microprocessor control section 22. If a high signal was generated by the radio transmit mode detector 30, the microprocessor control section 22 will develop the first control signal. The first control signal will cause the battery charging section 26 to increase the charging current by an amount equal to the transmitting current drained by the radio 12. On the other hand, the microprocessor control section 22 will develop a second control signal if there is no battery voltage drop caused by a transmitting radio, which will cause the charger circuit 20 to remain in the same state or be unchanged.

In radios where the transmitter can be damaged because the charger voltage exceeds a prescribed value while transmitting, the battery voltage clamp section 24 will clamp the charger voltage to a predetermined safe value upon being commanded by the first control signal from the microprocessor control section 22.

Functionally, the radio transmit mode detector 30 comprises five circuits or stages: a transient level shifter 34, a detector output stage 36, a feedback or latch 38, a reset or dekey circuit 42, and an inhibit circuit 44. Before a transmit condition occurs, the output 32 is at an low voltage condition to provide a low output signal. Upon transmitting, the voltage across the battery terminals or charger contacts 6 and 8 drops and is translated to a threshold voltage or output stage drive 46 to be provided to the output stage 32. This threshold voltage 46 causes the output signal 32 to change voltage in opposition to the initial condition. In other words, a high output signal is now provided for a logic high condition instead of the initial logic zero condition. The new output value 32 is fedback to the latch 38 as an input which causes the latch output signal or drive 48 to maintain the same circuit conditions until the current operational mode has been completed (such as by an operator dekeying the PTT switch, which is accessible by the operator, but inaccessible to the charger, to end transmission). Upon dekeying, the voltage across the battery terminals 6 and 8 rises to a second threshold voltage and the dekey or reset circuit 42 causes the latch drive 48 to be defeated in order to unlatch the output signal 32 from its high output condition.

When a radio is initially turned "ON" a much greater voltage drop than the voltage drop associated with the transmission mode occurs also across the battery terminals 6 and 8. To inhibit the detector output stage 36 from providing the high output signal for radio conditions not associated with the transmission mode such as this initial power on transient, an optional inhibit stage 44 is used. When the battery voltage across the battery terminals 6 and 8 decreases greater than a third threshold value due to the power "ON" voltage transient, the inhibit or supply "ON" ignore circuit 44 is driven into conduction which disables the output stage 32 from changing states (from the initial conditions).

Figure 2:
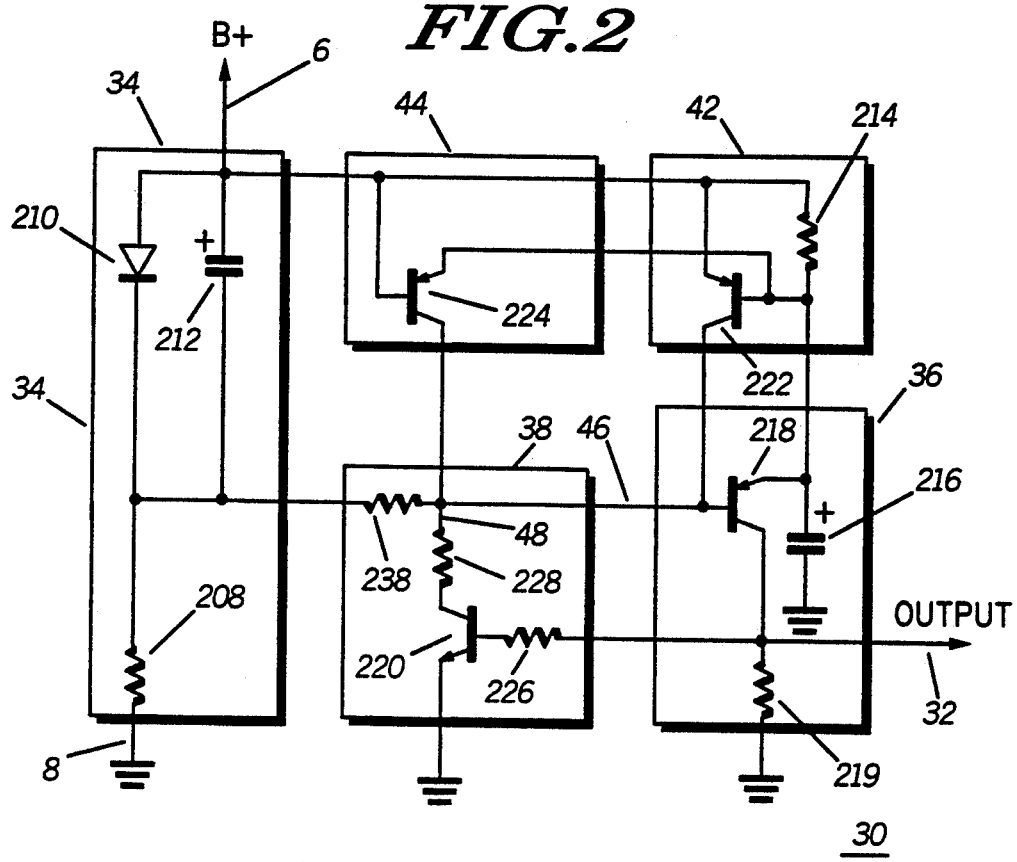
FIG. 2 is an electrical schematic diagram of the radio transmit mode detector of FIG. 1.

Referring to FIG. 2, a transistor implementation of the radio transmit mode detector 30 is shown using inexpensive discreet electronic components. The battery 4, not shown in FIG. 2 is connected to the first and second input terminals 6 and 8. A first resistor 208 causes sufficient current to flow through a silicon diode 210 such that the forward voltage drop of the diode 210 is approximately 0.6 volts. Assuming the radio is in a standby receive mode before transmission occurs, the battery voltage is initially at a constant voltage. Since a first capacitor 212 is coupled parallel with the diode 210, the voltage across the first capacitor 212 is charged up to the voltage across the diode 210. A second resistor 214 charges a capacitor 216 to approximately the supply voltage across the battery terminals 6 and 8. Since the voltage difference between the emitter and base of a transistor 218 is at most or clamped to 0.6 volts (due to the diode 210), the base bias of transistor 218 is not sufficient to cause the transistor 218 to conduct. As a result, the transistor 218 is open (OFF) and the output voltage at the collector of the transistor 218 is at ground potential to provide a low output signal. The output signal 32 is provided by a load resistor 219 connected to the collector of the transistor 218 and ground. The transistor 218 only turns "ON" when a sufficiently low voltage is provided at the base to turn that transistor on. With these initial conditions, the bases of a pair of transistors 222 and 224 are not at sufficiently low enough voltages for these transistors to turn "ON" either.

On the other hand, when a user transmits on the radio 12, the battery terminal voltage B+ across the battery terminals 6 and 8 drops abruptly due to the current drained by the radio 12 during transmission. The voltage at the cathode of the diode 210, which is also the voltage developed across the resistor 208, coupled by a resistor 238 to the base of the transistor 218, now falls sufficiently below the emitter voltage to cause the transistor 218 to conduct.

The voltage discharged across the capacitor 216 now drops below the battery terminal voltage B+ by the value of the voltage drop across the resistor 214 due to the conducting transistor 218. The output signal or voltage approximately equals the battery terminal voltage B+ minus the 0.6 volts dropped across the emitter base junction of the transistor 222 and developed across the resistor 214 to provide a high output signal 32.

This high output signal 32 is latched by causing the conduction of the transistor 220. The transistor 220 is biased "ON" by a resistor 226 coupling the output voltage 32 to the base of the transistor 220. As the transistor 220 is turned "ON", the base voltage at the transistor 218 is further decreased by the current drained through the resistors 238 and 228 to further decrease the voltage at the base of the transistor 218 to maintain the transistor 218 "ON".

To reset the transmit mode detector 30 from providing the high output signal 32, the user dekeys the PTT switch to end transmission. As the battery terminal voltage B+ rises above the voltage across the capacitor 216, the voltage developed across the resistor 214 provides an emitter base voltage drop large enough to cause the transistor 222 to conduct. The conduction of the transistor 222 diminishes the drive to the transistor 218. As the transistor 218 is turned "OFF", the output voltage 32 returns to a ground potential to provide a low signal.

Optionally, to ignore radio powering "ON" glitches or other voltage drop spikes that are greater than the voltage drops associated with the transmission mode, the transistor 224 is utilized. As the powering "ON" voltage spike occurs, the voltage at the base of the transistor 224 is lower than the capacitive voltage across the capacitor to cause the transistor 224 to conduct. As the current flows through the now conducting transistor 224, the base of the transistor 218 is also pulled up to a sufficiently high voltage that the transistor 218 is maintained "OFF" to provide a low output signal 32.

Figure 3:
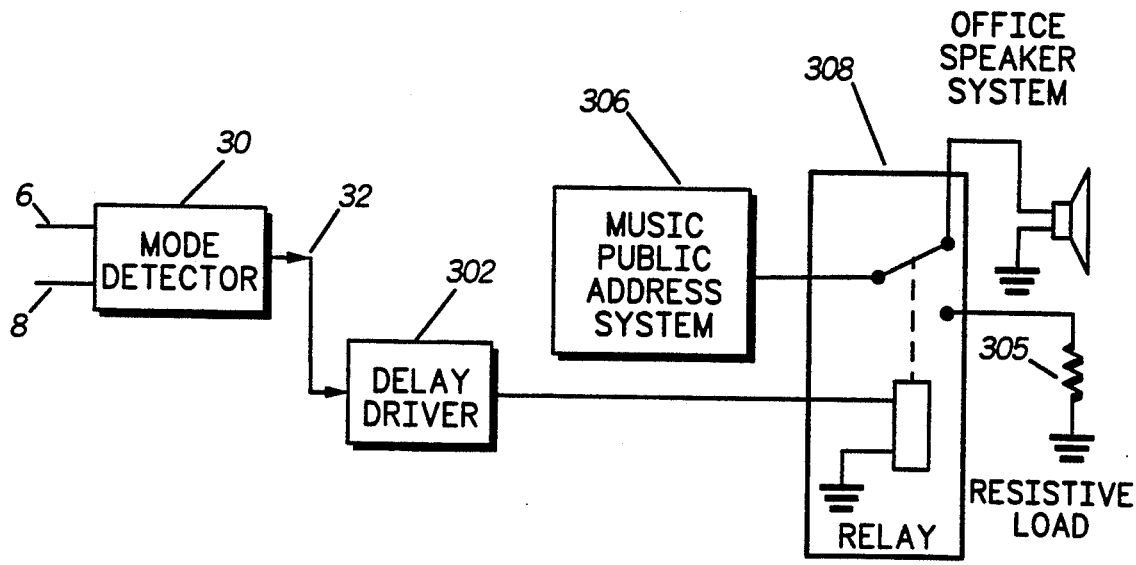
FIG. 3 shows a block diagram of the radio transmit mode detector 30 of FIG. 1 used in a non-charger application in accordance with the present invention.

Referring to FIG. 3, even though the radio transmit mode detector 30 can operate within a battery charger circuit as shown in FIG. 1, the radio transmit mode detector 30 can function in any electrical environment where the status or mode of the radio needs to be determined for operating other circuits. For example, if during the transmit mode of a radio, the operator desires the muting of office music, such that his or her voice can be heard more easily, then the output of the radio transmit mode detector 30 can short out the music public address system 306. In this embodiment, the high output 32 from the radio transmit mode detector 30 activates a relay driver 302 to switch out (305) the music public address system 306 by means of a relay switch 308.

In summary, the voltage drop associated with the transmission mode of a radio is shifted to a high output signal when the predetermined emitter base threshold voltage is sufficiently satisfied to bias the transistor 218 of the output detector stage 36 "ON". Meanwhile, the feedback of latch stage 38 maintains the constant high output condition during the entire duration of the transmit mode.

What is claimed is:

1. A battery charger having two terminals for charging a battery for a radio, the battery charger comprising:

charging means having a controllable parameter for charging the battery;
   operational mode detector means coupled to the two terminals for detecting an operational mode of the radio in response only to the voltage detected across the two terminals; and
   control means coupled to the operational mode detector means and to the charging means for controlling the controllable parameter in response to the operational mode detected.

2. The battery charger of claim 1, in which:
   the charging means comprises means for providing a controllable voltage for charging the battery; and
   the control means comprises means for clamping the controllable voltage to a predetermined maximum value, in response to the operational mode detected.

3. The battery charger of claim 1, in which:
   the charging means comprises means for providing a controllable charging current for charging the battery; and
   the control means comprises means for increasing the controllable charging current in response to the operational mode detected.

4. The battery charger of claim 1 wherein the operational mode detector means comprises a transient voltage sensing means for determining operational mode based only on the voltage sensed across the terminals.

5. The battery charger of claim 1, wherein the operational mode detector comprises:
   transient voltage level shifter means for shifting a voltage transient sensed at the two terminals;
   a detector connected to the transient voltage level shifter means for determining whether the voltage transient sensed corresponds to a threshold value for the operational mode;
   output means for providing an output signal in response to detecting the threshold value;
   latching means connected to the output means for maintaining the level of the output signal for the duration of the operation mode; and
   reset means for unlatching the latching means at the end of the operational mode.

6. The battery charger of claim 1, wherein the operational mode detector comprises:
   voltage sensing means for sensing a voltage drop across the two terminals;
   a detector connected to the voltage sensing means for determining whether the voltage drop sensed corresponds to a threshold value for a transmission mode;
   output means for providing an output signal in response to detecting the threshold value;
   inhibit means connected to the output means for inhibiting the output means from providing the output signal, responsive to voltage drops not associated with the transmission mode;
   latching means connected to the output means and to the inhibit means for maintaining the level of the output signal for the duration of the transmission mode; and
   reset means for unlatching the latching means at the end of the transmission mode.

7. The battery charger of claim 6, wherein the voltage sensing means includes a voltage level shifter for translating the voltage sensed into a higher voltage value to facilitate comparison with the threshold value.

8. The battery charger of claim 1, wherein the operational mode detector comprises:
   voltage sensing means having a first state in response to the voltage across the two terminals being below a first level and a second state in response to the voltage across the two terminals being above the first level;
   converter means for developing a charging voltage for charging the battery;
   current control means, coupled to the converter means and to the battery, the current control means being operative in response to the charging voltage and limiting the charging current to a first maximum charging current in response to a first control signal coupled thereto and to a second maximum charging current in response to a second control signal; and
   control circuit means, coupled to the current control means and to the battery, for developing the first control signal in response to the voltage sensing means being in the first state, and for developing the second control signal in response to the voltage sensing means being in the second state.

9. The battery charger of claim 1, wherein the operational mode detector detects the operational mode of the radio independent of a mode switch having first and second states respectively indicative of transmit and receive modes.

10. An automatic battery charging and voltage regulating system connected between a source of voltage and a battery to be changed, the battery being connected to current-consuming equipment, the system comprising:
    a pair of battery charging terminals;
    voltage sensing means having a first state in response to a battery charging terminal voltage below a first level and a second state in response to a battery charging terminal voltage above the first level;
    converter means for coupling to the source of voltage for developing a charging voltage for charging the battery;
    current control means coupled to the converter means and to the battery, the current control means being operative in response to the charging voltage, and limiting the charging current to a first maximum charging current in response to a first control signal coupled thereto, and to a second maximum charging current in response to a second control signal; and
    control circuit means, coupled to the current control means and to the battery, for developing the first control signal in response to the voltage sensing means being in the first state, and for developing the second control signal in response to the voltage sensing means being in the second state.

11. The system of claim 10, wherein the control circuit means detects an operational mode of the current-consuming equipment independent of a mode switch having first and second states respectively indicative of transmit and receive modes.

12. A transmit mode detector, for detecting a transmit mode of a rechargeable battery operated radio being charged by a battery charger, having two terminals for the battery, comprising:
    voltage sensing for sensing a voltage drop across the two terminals, a detector connected to the voltage sensing means for determining whether the voltage drop sensed corresponds to a threshold value for a transmission mode;

output means for providing an output signal in response to detecting the threshold value;

inhibit means connected to the output means for inhibiting the output means from providing the output signal, responsive to voltage drops not associated with the transmission mode;

latching means connected to the output means and to the inhibit means for maintaining the level of the output signal for the duration of the transmission mode; and reset means for unlatching the latching at the end of the transmission mode.

* * * * *